United States Patent
Adamowicz et al.

(10) Patent No.: US 12,055,668 B2
(45) Date of Patent: Aug. 6, 2024

(54) SONAR DEVICE

(71) Applicant: THALES, Courbevoie (FR)

(72) Inventors: Damien Adamowicz, Valbonne (FR); Nicolas Kuhl, Valbonne (FR); Pierre Clariond, Valbonne (FR); Frédéric Bugey, Valbonne (FR); Patrice Mistretta, Valbonne (FR)

(73) Assignee: THALES, Courbevoie (FR)

( * ) Notice: Subject to any disclaimer, the term of this patent is extended or adjusted under 35 U.S.C. 154(b) by 196 days.

(21) Appl. No.: 17/776,205

(22) PCT Filed: Nov. 19, 2020

(86) PCT No.: PCT/EP2020/082675
§ 371 (c)(1),
(2) Date: May 11, 2022

(87) PCT Pub. No.: WO2021/104988
PCT Pub. Date: Jun. 3, 2021

(65) Prior Publication Data
US 2022/0397655 A1    Dec. 15, 2022

(30) Foreign Application Priority Data
Nov. 27, 2019 (FR) ...................... 1913284

(51) Int. Cl.
*G01S 7/521* (2006.01)
*G01S 15/10* (2006.01)

(52) U.S. Cl.
CPC ............ *G01S 7/521* (2013.01); *G01S 15/104* (2013.01)

(58) Field of Classification Search
CPC .... G10K 11/008; G10K 11/34; G10K 11/355; G10K 2200/11; G01H 3/00; G01S 7/521;
(Continued)

(56) References Cited

U.S. PATENT DOCUMENTS 3,372,368 A * 3/1968 Dale ...................... G01V 1/201
  367/12
3,944,964 A * 3/1976 Loeser ................. G10K 11/008
  367/4

(Continued)

FOREIGN PATENT DOCUMENTS

EP    0410591 A2 *  7/1990  .......... G10K 11/008
EP    0 410 591 A2    1/1991
(Continued)

*Primary Examiner* — Daniel L Murphy
*Assistant Examiner* — Amie M Ndure
(74) *Attorney, Agent, or Firm* — BakerHostetler (57) ABSTRACT

A sonar device includes a support having negative buoyancy and a linear acoustic reception antenna comprising an elongated body that is elongated from a first end to a second end, the elongated body being connected by the first end at a connection point that is fixed relative to the support, the sonar device being able to be in a reception configuration, wherein the antenna body and the support are fully submerged and wherein the antenna body is able to be in a vertical orientation, wherein it extends substantially vertically from the first end to the second end toward the seabed, the sonar device comprising orientation adjustment means for adjusting, when the sonar device is in the reception configuration and the support is fixed relative to the terrestrial reference frame, an angle of elevation and an azimuth of the second end in the reference frame connected to the support centered on the connection point.

14 Claims, 6 Drawing Sheets

(58) Field of Classification Search
CPC . G01S 15/104; B63B 22/18; B63B 2022/006; H04R 3/005
USPC ............................ 367/101, 154, 173, 165, 4
See application file for complete search history.

(56) References Cited

U.S. PATENT DOCUMENTS

| | | | | |
|---|---|---|---|---|
| 3,973,236 A * | 8/1976 | McLaughlin | ........ | G01V 1/3826 114/244 |
| 3,992,737 A * | 11/1976 | Duel | ..................... | B63B 22/003 367/173 |
| 4,004,265 A * | 1/1977 | Woodruff | ............. | G01V 1/3843 367/4 |
| 4,631,956 A * | 12/1986 | Walden | ................. | B63B 22/003 441/25 |
| 4,958,328 A * | 9/1990 | Stubblefield | ........... | G01V 1/201 367/20 |
| 5,056,065 A * | 10/1991 | Bruengger | ........... | G01V 1/3843 367/4 |
| 5,412,622 A * | 5/1995 | Pauer | ........................ | H04R 1/44 367/136 |
| 5,469,407 A * | 11/1995 | Saunders | ............. | G10K 11/008 367/173 |
| 5,566,908 A * | 10/1996 | Greenhalgh | ........... | F42B 10/62 244/36 |
| 6,418,082 B1 * | 7/2002 | Hollis | ................... | G01S 3/8036 367/118 |
| 2013/0229894 A1 * | 9/2013 | Reuter | ..................... | H04R 1/44 367/154 |
| 2021/0132204 A1 * | 5/2021 | Caspall | ............... | G01S 15/8902 |

FOREIGN PATENT DOCUMENTS

| | | | | |
|---|---|---|---|---|
| EP | 4023542 A1 * | 7/2022 | ........... | B63B 22/003 |
| FR | 2 685 781 A1 | 7/1993 | | |
| FR | 2685781 A1 * | 7/1993 | ............ | G01S 15/06 |
| GB | 2141470 A * | 12/1984 | ........... | B63B 22/025 |
| JP | 2003-4849 A | 1/2003 | | |

\* cited by examiner

SONAR DEVICE

CROSS-REFERENCE TO RELATED APPLICATIONS

This application is a National Stage of International patent application PCT/EP2020/082675, filed on Nov. 19, 2020, which claims priority to foreign French patent application No. FR 1913284, filed on Nov. 27, 2019, the disclosures of which are incorporated by reference in their entirety.

FIELD OF THE INVENTION

The invention is in the field of sonars and more specifically of monitoring maritime zones. More specifically, it relates to the sonar devices that are used for locating noise generators from measurements acquired by a submerged sonar detection antenna. A noise generator is understood to mean any underwater or surface sound source.

BACKGROUND

These sonar devices usually comprise an acoustic reception antenna and processing means for locating a noise generator from measurements obtained by the sonar detection antenna.

A known solution involves using a linear acoustic reception antenna that is towed by a surface ship. A noise generator is located from measurements acquired by the transducers of the antenna at different times as the surface ship moves. However, this type of sonar device requires heavy means of the surface ship type (generally a frigate). In addition, this surface ship must be moving, which can be very energy consuming and makes it difficult to locate a noise generator in a zone of limited size. Furthermore, this type of solution has limited discretion.

In the case of a sonar that is fixed or for which the movement is not controlled, with the hydrophones having no particular directivity, a noise generator cannot be precisely located without using a volume antenna having hydrophones that are distributed over the three dimensions of space. The hydrophones convert the acoustic waves that they receive into electrical signals. Processing means allow reception channels to be formed that allow a directivity of the antenna to be artificially recreated. It is thus possible, by defining different sets of delays applied to the electrical signals provided by the different hydrophones, to listen in different directions, which allows any ambiguities to be removed relative to the location of the noise generator and allows precise location information to be obtained. This precision is obtained at the expense of a larger, heavier detection antenna.

SUMMARY OF THE INVENTION

An aim of the invention is to limit at least one of the aforementioned disadvantages.

To this end, the aim of the invention is a sonar device comprising a support, the support having negative buoyancy, and a linear acoustic reception antenna, the linear acoustic reception antenna comprising an elongated body that is elongated from a first end to a second end, the elongated body being connected by the first end at a connection point that is fixed relative to the support. The sonar device is able to be in a reception configuration, in which the antenna body and the support are fully submerged and in which the antenna body is able to be in a vertical orientation, in which the antenna body extends substantially vertically from the first end to the second end toward the seabed. The sonar device comprises orientation adjustment means for adjusting, when the sonar device is in the reception configuration and the support is fixed relative to the terrestrial reference frame, an angle of elevation and an azimuth of the second end in a reference frame connected to the support centered on the connection point.

Advantageously, the sonar device comprises relative positioning adjustment means for adjusting a relative positioning of the electro-acoustic transducers of the sonar antenna when the second end has a predetermined angle of elevation and a predetermined azimuth, when it exists.

Advantageously, the sonar device comprises processing means configured to locate a noise generator from several sets of acoustic measurements generated by the acoustic reception antenna, the sets of acoustic measurements comprising a first set of measurements acquired by the acoustic reception antenna when the second end occupies a first position relative to the support, i.e. in the reference frame connected to the support, and a second set of measurements acquired by the acoustic reception antenna when the second end occupies a second position relative to the support.

In a first embodiment, the linear acoustic reception antenna comprises a plurality of acoustic transducers distributed along a row of transducers that is able to be rectilinear and has a curvature that is able to vary under the effect of the movement of the second end relative to the support.

In a second embodiment, the linear reception antenna comprises a plurality of acoustic transducers distributed along a straight row of transducers.

The antenna body is, for example, connected to the support by a ball joint.

Advantageously, the adjustment means comprise drive means for moving the second end relative to the support.

The drive means advantageously comprise a propulsion unit.

The drive means advantageously comprise a ballast having a variable mass density.

In a particular embodiment, the drive means are mounted on the antenna body.

In another particular embodiment, the drive means comprise a propulsion unit able to transiently cooperate with the antenna body to allow adjustment of the angle of elevation and the azimuth of the second end.

Advantageously, the sonar device comprises a submersion adjustment device for adjusting a depth of the linear acoustic reception antenna.

The invention also relates to a method for locating a noise generator from a sonar device according to the invention. The method comprises a step of estimating a positioning zone of the noise generator from several sets of acoustic measurements comprising a first set of acoustic measurements acquired when the second longitudinal end occupies a first position relative to the support, as well as a second set of acoustic measurements acquired when the second longitudinal end occupies a second position relative to the support.

The invention also relates to a method for detecting and locating a noise generator from a sonar device according to the invention. The method comprising a step of acquiring a first set of acoustic measurements when the second longitudinal end occupies a first position relative to the support, a step of acquiring a second set of acoustic measurements when the second longitudinal end occupies a second position relative to the support, a step of detecting a noise generator from the first set of acoustic measurements and the second set of acoustic measurements, and a step of estimating a positioning zone of the noise generator from the first set of acoustic measurements and from the second set of acoustic measurements.

BRIEF DESCRIPTION OF THE DRAWINGS

Further features and advantages of the invention will become apparent from reading the following detailed description, which is provided by way of a non-limiting example, and with reference to the appended drawings, in which.

The same elements are identified using the same reference signs from one figure to the next.

DETAILED DESCRIPTION

The invention relates to a sonar device comprising a sonar acoustic reception antenna with simple geometry and that is configured so as to allow acoustic measurements to be acquired for locating a noise generator with relatively good precision. The sonar device allows acoustic measurements to be acquired even if the antenna is mechanically connected to a support that is fixed relative to the terrestrial reference frame. The invention also relates to a sonar system comprising the sonar device.

Figure 1:
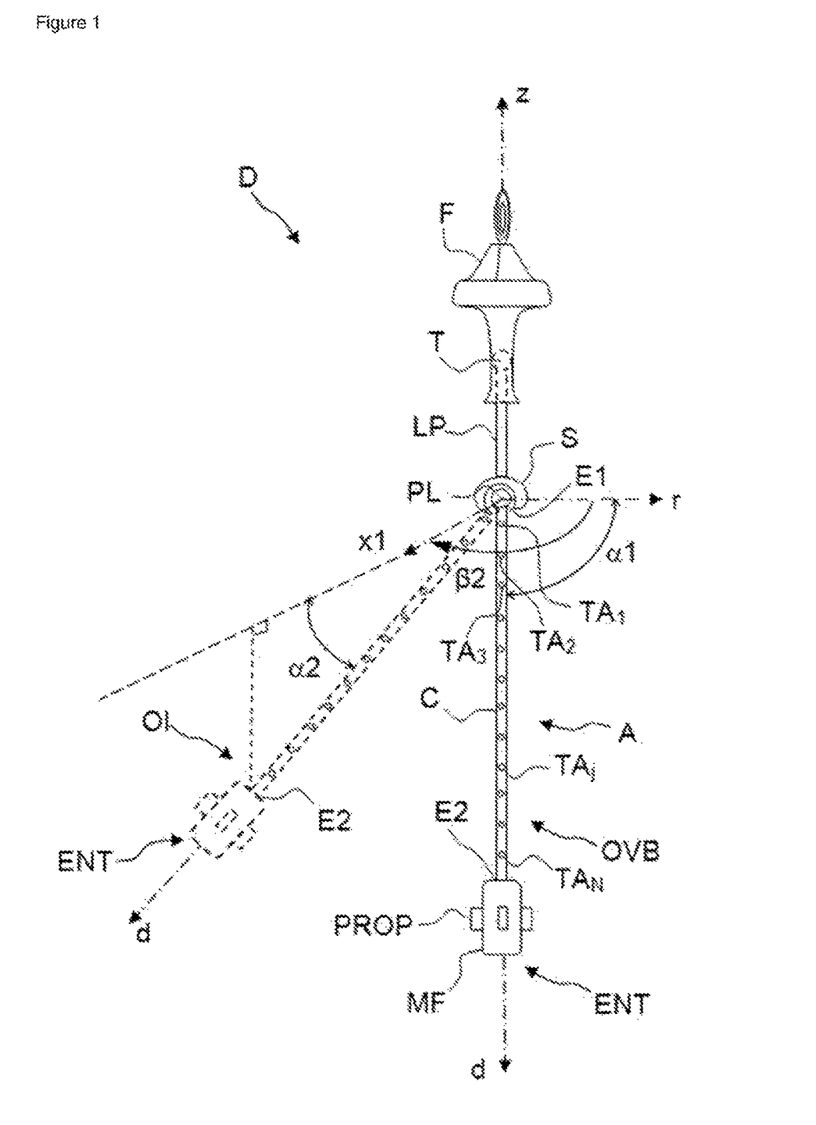
FIG. 1 schematically shows a sonar device according to a first embodiment of the invention in two reception configurations.

FIG. 1 schematically shows a sonar device according to a first embodiment of the invention.

The sonar device D comprises a float F and a dive line LP connecting the float F to a support S. The support S has negative buoyancy. The support S connects the dive line LP to an acoustic reception antenna A.

The acoustic reception antenna A allows acoustic measurements to be acquired.

The reception antenna A comprises a plurality of acoustic transducers $TA_j$, with j=1 to N, where N is an integer greater than 1 corresponding to the number of acoustic transducers.

An acoustic transducer $TA_j$ is understood to mean a transducer able to convert an acoustic wave into an acoustic measurement, i.e. to acquire an acoustic measurement. Acoustic measurement is understood to mean a signal representing an acoustic intensity and an acoustic frequency as a function of time over an acquisition duration.

An acoustic transducer $TA_j$ is, for example, an electro-acoustic transducer, for example a hydrophone, converting an acoustic wave into an electrical signal representing an intensity and a frequency of the acoustic wave detected by the transducer as a function of time over an acquisition duration, or is even an opto-acoustic transducer converting an acoustic wave into an optical signal representing an intensity and a frequency of the acoustic wave detected by the transducer as a function of time over an acquisition duration.

The acoustic measurement provided by an acoustic transducer comprises, for example, several series of elementary intensity measurements carried out during different elementary durations of the acquisition duration. Each series of elementary measurements is carried out at a predetermined acoustic frequency or in a predetermined acoustic frequency band distinct from the other frequencies/frequency bands of the other elementary series. The acoustic measurement provided by a transducer is, for example, in the form of a series of intensity-time matrices produced at different frequencies. Each matrix or elementary measurement comprises intensity values measured over different elementary durations at a determined frequency or in a determined frequency band. The different elementary measurements are obtained at different frequencies or in distinct frequency bands. The antenna A comprises an antenna body C integrating the acoustic transducers $TA_j$ of the antenna A. The antenna body C is an elongated body longitudinally extending from a first end E1 to a second end E2.

The antenna body C is mechanically connected to the support S.

As shown in FIG. 1, the antenna A is linear. It comprises a plurality of acoustic transducers $TA_j$ distributed along a row of transducers that is able to be straight, i.e. rectilinear. The antenna body C is elongated along the row of transducers.

The acoustic transducers $TA_j$ are arranged on different curvilinear abscissas along the row of transducers d. The antenna of the embodiment of FIG. 1 comprises a single acoustic transducer on each curvilinear abscissa. As an alternative embodiment, the antenna comprises a plurality of acoustic transducers on each curvilinear abscissa. Acoustic transducers are disposed, for example, around a row of transducers.

In the non-limiting embodiment of FIG. 1, this row of transducers is a straight line d.

The elongated body C is connected by the first end E1 to the support S and, more specifically, to a connection point PL that is fixed relative to the support.

In the non-limiting embodiment of FIG. 1, the antenna A is connected to the support S by a ball joint. Thus, the first longitudinal end E1 is translationally fixed relative to the support S along three axes of an orthogonal reference frame connected to the support S. The connection point PL is the center of the ball joint in this embodiment.

The second end E2 of the antenna body C is free.

The sonar device D is configured to operate, i.e. to carry out acoustic measurements and to locate noise generators, when it is in a reception configuration. The sonar device D according to the invention is able to assume several reception configurations.

In this reception configuration, as shown in FIG. 1, the body of the antenna C and the support S are fully submerged.

In the non-limiting case of the device of FIG. 1, the float F floats on the surface of the water and the dive line LP extends substantially vertically under the effect of the positive buoyancy of the float F and of the negative buoyancy of the support S. A vertical direction or a vertical axis is substantially perpendicular to the surface of the sea in calm sea conditions.

The acoustic reception antenna is mechanically connected to the support S and is configured so as to be able to occupy several orientations in a reference frame connected to the support centered on the connection point PL.

The antenna is able to be in a low vertical orientation OVB shown as a solid line in FIG. 1, in which the antenna body C is suspended from the support S and longitudinally extends substantially vertically from the first end E1 to the second end E2 toward the seabed.

According to the invention, the antenna body C is configured and connected to the connection point PL so that a second end E2 is movable relative to the support S and relative to the first end E1, and more specifically so that an angle of elevation and an azimuth of the second end E2, in an orthogonal reference frame (r; x1; z) connected to the support S and centered on the connection point PL, are variable.

Each reception configuration of the antenna is characterized by an angle of elevation and an azimuth (when it exists).

The sonar device D according to the invention also comprises means for adjusting the orientation of the antenna A, allowing an angle of elevation and an azimuth of the second end E2 to be adjusted relative to the support, i.e. in a reference frame connected to the support S centered on the connection point PL. These orientation adjustment means allow the orientation of the antenna to be adjusted when the sonar device D is in the reception configuration and the support S is fixed relative to the terrestrial reference frame. In other words, the orientation adjustment means allow a position of the second end E2 of the antenna body C to be adjusted relative to the support S along the three directions of a three-dimensional reference frame connected to the support S when the support S occupies a fixed position in the terrestrial reference frame.

The orientation adjustment means allow this adjustment to be provided when the sonar device D is in a reception configuration and the support S is fixed relative to the terrestrial reference frame.

This allows an orientation of the antenna to be modified in a reference frame connected to the support S, i.e. it allows an orientation of the row of transducers to be modified when it is straight or more generally a straight line connecting the two ends E1 and E2 or the connection point PL and E2.

The angle of elevation of the second end E2 is the angle formed between a horizontal plane (r; x1) passing through the connection point PL and the straight line connecting the connection point PL to the end E2 and the azimuth of the second end E2 is the angle formed around a vertical z-axis of the reference frame (r; x1, z) connected to the support S between a horizontal axis of reference r of this reference frame and the straight line connecting the connection point PL to the end E2. The angle of elevation is positive when the second end is above the horizontal plane (r; x1) and is negative when it is below said plane.

The orientation adjustment means comprise drive means ENT allowing, when the support S is fixed, the second end E2 of the antenna body C to be moved relative to the support S along the three directions of the reference frame connected to the support. These drive means ENT allow the second end E2 to be moved in the reference frame connected to the support so as to vary its angle of elevation and its azimuth. This movement of the second end E2 relative to the support S causes the second end E2 to move relative to the first end E1.

Thus, the drive means ENT allow the end E2 to be moved, even when the support S is fixed in the terrestrial reference frame, relative to the support S, from the position that it occupies when the antenna body C is in the low vertical orientation OVB to an inclined orientation OI, as shown by the dashed lines in FIG. 1. In the low vertical orientation OVB, the second end has an angle of elevation $\alpha1$ of $-\pi/2$, with the azimuth not being defined, i.e. not existing, for this angle of elevation.

The azimuth exists and is adjustable when the angle of elevation differs from $-\pi/2$ or $\pi/2$.

In the inclined orientation of FIG. 1, the second end has an angle of elevation $\alpha2$ that is negative and is greater than $-\pi/2$ and has an azimuth $\beta2$.

Advantageously, the drive means ENT allow the angle of elevation of the second end E2 to be continuously varied between $-\pi/2$ and a maximum angle of elevation. The maximum angle of elevation is greater than $-\pi/2$. It can be negative, zero or positive. It can be equal to $\pi/2$, for example.

Advantageously, the drive means ENT allow the azimuth of the second end E2 to be continuously varied between 0 and $2\pi$ exclusive when the angle of elevation differs from $-\pi/2$ and $\pi/2$.

The orientation adjustment means also comprise control means for controlling the drive means so that the drive means ENT adjust the angle of elevation of the second end E2 to a target angle of elevation and the azimuth of the second end E2 on a target azimuth, when the support S is fixed in the terrestrial reference frame, i.e. relative to the earth.

The antenna A of the sonar device D according to the invention thus can be dynamically oriented in space, even if the support S is fixed, which allows a three-dimensional antenna to be virtually recreated from a linear antenna and thus allows channels to be formed in different directions along the direction of the straight line x. The sonar device D according to the invention therefore allows acoustic measurements to be acquired allowing a noise generator to be located, with better precision than with a linear antenna that is fixed or for which the movement is not controlled, from a linear antenna with simple geometry and that is economical in terms of acoustic transducers. The performance capabilities of the antenna in terms of location are no longer limited by its geometry.

Indeed, when the noise generator is fixed relative to the support S, a linear antenna suspended vertically from the connecting means, as in the low vertical orientation OVB of FIG. 1, allows different listening directions to be obtained by making several formations of channels by applying different sets of delays to the same set of acoustic measurements simultaneously acquired by the different acoustic transducers of the antenna. The different listening directions (or channel directivities) are elevation adjustable but not azimuth adjustable. Thus, forming channels from signals obtained from a vertical linear antenna allows the angle of elevation of the direction on which the noise generator is located to be obtained, but not the azimuth of this direction. In other words, it is possible to deduce, from the measurements obtained by the antenna, a first conical surface C1 with a z-axis, shown in FIG. 2, on which a noise generator B is generally located, but it is not possible to know precisely where the noise generator is located on this surface. In practice, the positioning zone defined for a noise generator detected from a channel forming a predetermined angle of elevation corresponds to a generally conical or pseudo-conical local volume with a z-axis comprising the first conical surface C1, with the same apex and axis as the first conical surface and having an angular elevation opening around the angle of elevation. The angular elevation opening decreases with the angle of elevation from 0 to π/2 because the positioning precision increases in this direction.

Figure 2:
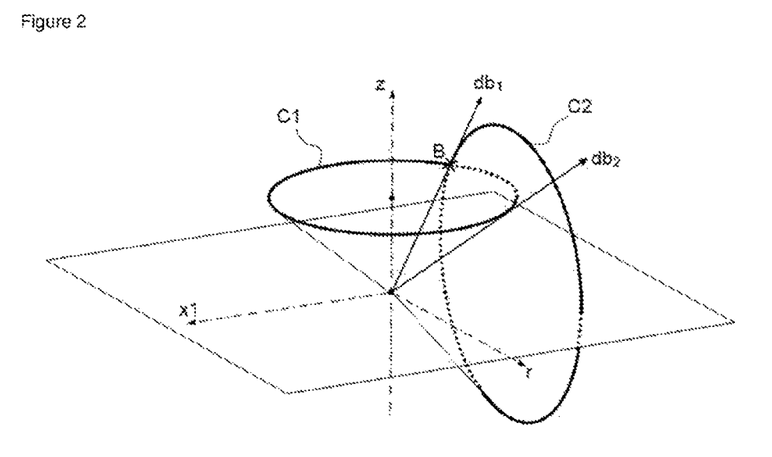
FIG. 2 schematically shows conical positioning zones obtained from a linear acoustic reception antenna.

By subsequently bringing the linear antenna along the second axis perpendicular to the z-axis, and by acquiring acoustic measurements when the antenna is in this orientation, the channel formations from measurements simultaneously acquired by the acoustic transducers of the antenna in this orientation allow the azimuth of the noise generator to be deduced. It is possible to deduce a reduced volume therefrom that is formed around two half-straight lines db1 and db2. The noise generator B is located in this reduced volume. These half-straight lines correspond to the intersection between the first conical surface C1 and a second conical surface C2, as shown in FIG. 2. In practice, the reduced volume corresponds to the intersection of the two pseudo-conical volumes each comprising one of the conical surfaces C1 and C2 and the axis and apex of which are the same as those of the corresponding conical surface C1 or C2. By arranging the linear antenna along a third axis, for example, horizontal and perpendicular to the second axis, and by acquiring acoustic measurements when the antenna is in this orientation, forming channels from acoustic measurements simultaneously acquired by the acoustic transducers of the antenna in this position allows the ambiguity relative to the position of the noise generator to be removed and therefore allows the positioning precision of the noise generator to be improved. The noise generator B is located in an even smaller volume centered on a point B located at the intersection of the three conical surfaces. In practice, the smaller volume centered on point B is the intersection of the three pseudo-volumes each comprising one of the three conical surfaces and with the same axis and same apex as the corresponding conical surface.

This invention is particularly suitable for locating a noise generator that is fixed relative to the support.

The sonar device according to the invention allowing dynamic reorientation of the antenna allows a method to be implemented in which the antenna is repositioned and acoustic measurements are acquired until a position is obtained with predetermined precision.

The sonar device according to the invention is able to be implemented from a static support S. It does not require the antenna to be towed by a seagoing vessel, which makes it economical and able to be used in a size-limited zone. It is also discrete.

In addition, this sonar device is easily deployable from a single attachment point (buoy).

In the particular embodiment of FIG. 1, the row of transducers d is a straight line. The antenna is configured so that the row of transducers has this linear shape in the reception configuration, irrespective of the position of the end E2.

In other words, the drive means ENT allow, as shown in FIG. 1, an incline of the antenna A to be varied, in particular of the straight row of transducers relative to a horizontal plane connected to the support S and relative to a vertical plane connected to the support S and containing the r-axis.

Figure 3:
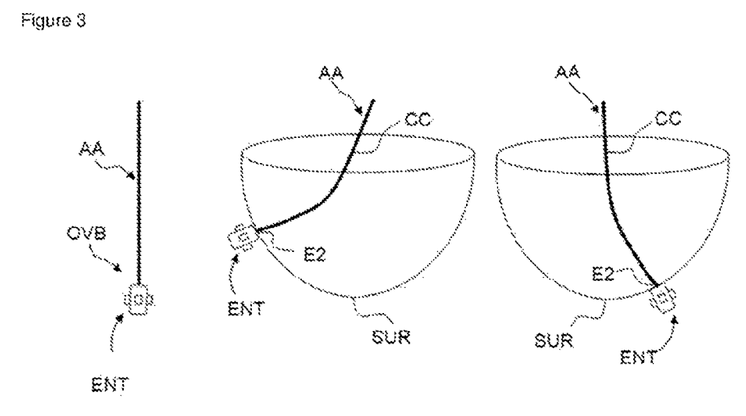
FIG. 3 schematically shows part of the sonar device according to a second embodiment of the invention in a low vertical orientation, and two other reception configurations.

In a second embodiment shown in FIG. 3, the antenna AA differs from the antenna of FIG. 1 in that it is flexible. In other words, the transducers are distributed along a row of transducers that is able to be straight or rectilinear and is able to bend under the effect of a movement of the end E2 relative to the support S. This is permitted by virtue of the flexibility of the antenna body CC.

The antenna AA is configured, for example, to extend in a substantially vertical straight line in the low vertical orientation OVB shown in FIG. 3 on the left-hand side and to be curved in inclined configurations, as shown in FIG. 3 in the middle and on the right-hand side. The antenna bends when the drive means move the second end E2 away from its equilibrium position shown in FIG. 3 on the left-hand side.

The end E2 is, for example, able to occupy the points of a surface SURF that is generally semi-spherical or spherical or is generally an ellipsoid or half-ellipsoid, as shown in FIG. 3.

The antenna A can be connected to the support S by a ball joint, as shown in FIG. 1.

More generally, the antenna can be connected to the support S by a connection with three degrees of rotational freedom. A certain amount of travel can be allowed, for example, along one or more axes of translation.

To this end, the first end E1 of the flexible antenna AA or straight linear antenna A, is connected, for example, to the support S by a connection body that is able to deform under the effect of the movement of the second end E2, by the drive means ENT, relative to its equilibrium position.

As an alternative embodiment, the antenna body CC is flexible and is directly fixed to the support S, in other words, the first end E1 and the connection point PL occupy the same position.

The drive means ENT comprise, for example, as shown in FIG. 1, a propulsion unit PROP allowing the second end E2 to move relative to the support S (when the support is fixed in the terrestrial reference frame), at least along two orthogonal directions in a horizontal plane, and preferably, but not necessarily, along a vertical z-axis.

In the non-limiting example of the figures, the propulsion unit PROP comprises turboprops configured and arranged around the second end E2 so as to allow the second end to move relative to the support S in three orthogonal directions, when the support is fixed in the terrestrial reference frame.

Advantageously, the drive means ENT comprise a buoyancy modification device MF mounted on the second end E2. This allows the energy that is consumed by the propulsion unit PROP in order to modify its angle of elevation to be limited, then allows it to be kept at a predetermined angle of elevation without using the propulsion unit and therefore limits the energy that is consumed. Furthermore, not having to use the drive means ENT to keep the angle of elevation fixed avoids any pollution of the measurements acquired by the antenna by acoustic, electrical or magnetic noise that is likely to be generated by the drive means.

To this end, the drive means ENT are configured to allow the angle of elevation to be kept constant over the entire angle of elevation range extending from the minimum angle of elevation to the maximum angle of elevation.

The buoyancy modification device allows the reconfiguration of the antenna to be accelerated and therefore allows the latency time between two successive acquisitions to be limited.

Advantageously, but not necessarily, the low vertical orientation OVB is a rest or equilibrium orientation of the antenna body C. This is, for example, the rest orientation of the antenna when buoyancy variation means MF have minimal buoyancy while a propulsion unit PROP, connected to the antenna, is off.

Advantageously, the antenna body C can have neutral buoyancy. As an alternative embodiment, the antenna body has negative or positive buoyancy.

Figure 4:
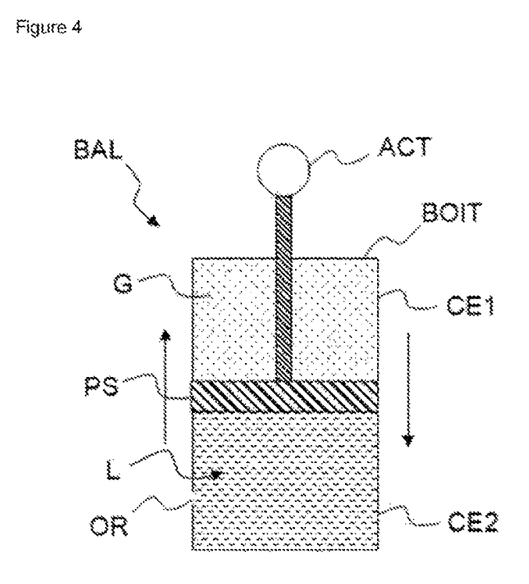
FIG. 4 schematically shows an example of a buoyancy modification device.

As shown in FIG. 4, the buoyancy modification device MF comprises, for example, a ballast BAL with variable mass density, i.e. with a fixed volume and a variable mass or with a fixed mass and a variable volume, and controllable means allowing this mass or this volume to be varied.

For example, the ballast BAL has a fixed volume and a variable mass. It comprises a housing BOIT containing a gas and a liquid, and a piston PS sealably separating a first sealed compartment CE1 of the housing BOIT containing the gas G and a second compartment CE2 of the housing B containing the liquid L and fluidly connecting with the external marine environment via an orifice OR. The buoyancy modification device MF comprises an actuator ACT allowing the piston PS to translationally move so as to modify the volumes of the compartments CE1 and CE2, with the volume of compartment CE1 increasing when the volume of compartment CE2 decreases. The translation movement of the piston PS thus modifies the amount of liquid in the second compartment CE2, which modifies the buoyancy of the ballast BAL, which also causes the volume occupied by the gas G in the first compartment CE1 to be modified.

Advantageously, the drive means ENT are arranged in the vicinity of the second end of the antenna A. This position is advantageous in terms of the length of the lever arm. In the case of a flexible antenna, it is also advantageous in terms of controlling the shape of the antenna when it moves and it allows a continuous evolution of the radius of curvature of the antenna to be obtained over its entire length.

As an alternative embodiment, the drive means ENT are arranged between the ends E1 and E2 or are even distributed along the antenna.

In the previous examples, the drive means ENT are mounted on the antenna.

As an alternative embodiment, the drive means comprise, for example, an adjustable length cable connected to the antenna, for example, at the second end, and a winch allowing the length of the cable to be adjusted so as to allow the angle of elevation of the second end E2 to be adjusted, and a rotary actuator for adjusting the azimuth of the second end E2.

As an alternative embodiment, the drive means ENT comprise an independent propulsion unit able to transiently cooperate with the antenna in order to move the second end of the antenna. The propulsion unit is of the underwater drone type, for example. The invention then relates to a sonar device or to a sonar system comprising the sonar device and the drive means.

In this latter case, the low vertical orientation OVB is an equilibrium orientation of the antenna when, in the case of a propulsion unit PROP, it is able to transiently cooperate with the antenna in order to move the second end E2 of the antenna, the propulsion unit PROP is separated from the antenna.

Advantageously, the sonar device comprises submersion adjustment means or a submersion adjustment device allowing the depth or the submersion IM of the antenna A to be adjusted. These means allow, when the antenna is at a certain depth, acoustic measurements to be obtained that originate from a zone that is a shadow zone for the antenna when said antenna is at another depth. A shadow zone is created by the underwater acoustic propagation defined by the bathymetry profile of the acoustic waves as a function of the depth. Lowering the second antenna therefore allows a shadow zone to be moved and the detection and/or the position of a noise generator to be confirmed or specified. These means therefore allow the capabilities for detecting noise generators to be improved and therefore allow the capabilities for locating noise generators to be improved. Varying the submersion of the antenna can also improve the "signal-to-noise" level of a noise generator detected by the antenna.

These submersion adjustment means comprise, for example, in a non-limiting manner, a winch T allowing the length of the dive line L, and therefore the depth of the support S, to be adjusted. The winch T can be integrated into the float F, as in FIG. 1, or into the support S.

Advantageously, the sonar device comprises relative positioning adjustment means allowing the relative positioning of the acoustic transducers TA of the antenna A to be adjusted when the antenna body C is fixed relative to the support S. In terms of detection, the variation of the relative positioning of the transducers determines the performance capabilities related to the detected frequency ranges and to the range of the antenna. A long antenna detects noise generators emitting at very low frequency at very long distances, conversely a smaller antenna has a shorter range and allows noise generators to be detected that are emitting at medium and high frequency. This advantage of adjusting the relative positioning of the transducers therefore allows additional indications to be provided relative to the near/far location of the noise generators. The positioning adjustment means comprise, for example, linear actuators able to linearly move the different transducers on the same straight line and position sensors allowing the positions of the different sensors to be detected on the straight line, with the sensors sending the detected positions to means for controlling the transducers. As an alternative embodiment, the transducers are kept spaced apart in pairs by compression springs, with end stops allowing the springs to remain compressed. Linear actuators are provided to vary the distance between the end stops, so as to vary the spacing between the transducers. Of course, other solutions can be contemplated.

Thus, in the particular and non-limiting embodiment of the figures, each reception configuration is characterized by a set of configuration parameters comprising an angle of elevation, an azimuth (when it exists), submersion of the reception antenna and a relative position between the sensors. These configuration parameters are independently adjustable by the adjustment means.

As an alternative embodiment, only the angle of elevation and the azimuth are variable.

Generally, the sonar device comprises at least means for varying the angle of elevation and the azimuth.

In FIG. 1, the float F or main support is located above the support S along a vertical z-axis.

As an alternative embodiment, the main support F is located above the surface of the water, such as a platform of a helicopter, or any partially submerged or fully submerged support located above the support S along a vertical axis in the reception configuration.

Figure 5:
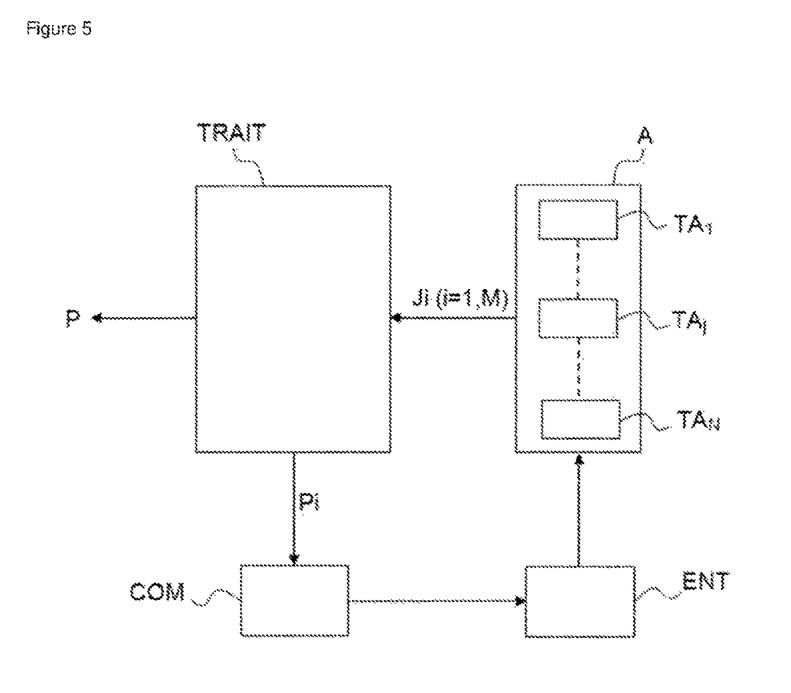
FIG. 5 shows a block diagram of the sonar device according to the invention.

FIG. 5 shows a block diagram of the sonar device or sonar system according to the invention.

This device comprises processing means TRAIT configured to implement a location method, i.e. to compute a position P or positioning zone of a noise generator B from several sets of acoustic measurements Ji, with i=1 to M, acquired by the acoustic reception antenna as explained above. M is the number of sets of measurements and is greater than 1. The processing means TRAIT implement a method for locating the noise generator B, when a condition for implementing this location method is met.

The condition is the detection of a noise generator, for example.

Advantageously, the processing means TRAIT are able to provide setpoint positions so as to control the control means COM so that they control the drive means ENT so as to adjust the position of the second end to the setpoint position. More generally, the processing means TRAIT are configured to provide adjustment instructions so as to control the control means COM so that they control the drive means in order to adjust the reception configuration to a control configuration.

Figure 6:
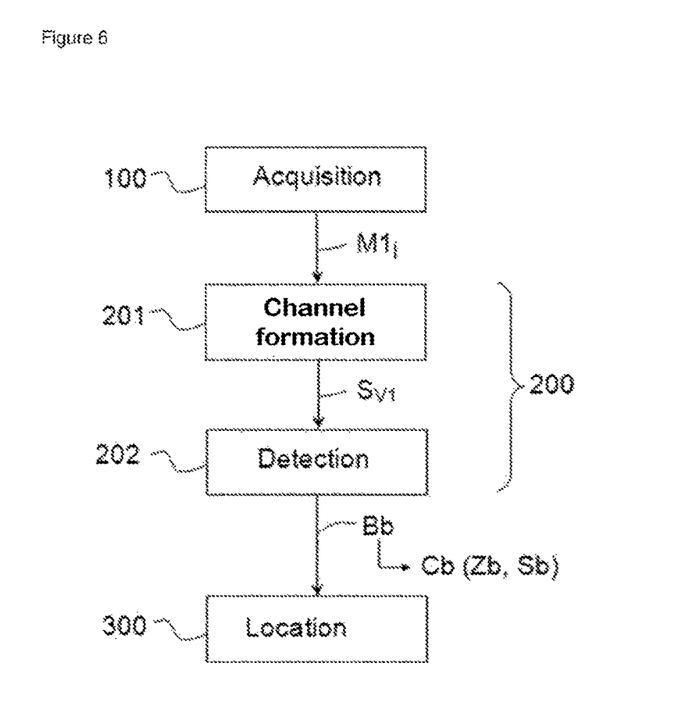
FIG. 6 shows steps of a detection and location method according to the invention.

The invention also relates to a method for detecting and locating a noise generator comprising the different steps listed in FIG. 6.

The method comprises a first step 100 of acquiring sonar measurements from the antenna, with the antenna being in a first reception configuration, in which the second longitudinal end E2 occupies a first position relative to the support S, i.e. in a reference frame connected to the support.

During this step 100, each acoustic transducer $TA_j$ provides, as shown in FIG. 6, a first acoustic measurement $M1_j$ representing an acoustic intensity and an acoustic frequency as a function of time over the acquisition duration. This first acoustic measurement $M1_j$ comprises, for example, several series of elementary intensity measurements carried out during different elementary durations of the acquisition duration. Each series of elementary measurements is carried out at a predetermined acoustic frequency or in a predetermined acoustic frequency band distinct from the other frequencies/frequency bands of the other elementary series. The acoustic measurement provided by a transducer is, for example, in the form of a series of intensity-time matrices produced at different frequencies. Each matrix or elementary measurement comprises intensity values measured over different elementary durations at a determined frequency or in a determined frequency band. The different elementary measurements are obtained at different frequencies or in distinct frequency bands.

The method comprises a step 200 of detecting a noise generator comprising a first step 201 of forming channels from acoustic measurements acquired by the different acoustic transducers during step 100. More specifically, at least one sonar channel is formed from a first set J1 comprising the first acoustic measurements $M1_j$, with j=1 to N, acquired by the transducers. A sonar channel is formed by applying a set of delays to the different acoustic measurements $M1_j$, with j=1 to N, provided by the different acoustic transducers $TA_j$. The sets of applied delays are different for the different sonar channels. This allows an acoustic signal to be obtained for each channel. The acoustic signal obtained when forming a channel represents an acoustic intensity as a function of the acoustic frequency in the listening direction representing the corresponding channel. On completion of step 201, a first set of acoustic signals $S_{v1}$ is obtained, with v1=1 to V1, where V1 is a whole number greater than or equal to 1 of channels formed for the antenna. This set is, for example, in the form of a frequency-channel directivity matrix comprising different acoustic signal intensity values $S_k$ obtained for different frequency-channel directivity pairs.

In practice, channels are formed by azimuth and/or by elevation.

If the antenna extends substantially linearly and substantially along a vertical z-axis, channels are advantageously formed only by elevation and if the antenna extends substantially linearly and substantially along a horizontal axis, channels are advantageously formed only by azimuth. If the antenna is in an intermediate orientation, channels are advantageously formed by azimuth and by elevation.

In a step 202, detected noise generators Bb are detected with b=1 to BB, where BB is the number of noise generators detected from the channels formed for the reception antenna as a function of a predetermined detection criterion. The number BB of detected noise generators can, as an alternative embodiment, be zero. Each detected noise generator is characterized by a set of features Cb comprising:
  an acoustic signal Sb representing an acoustic intensity as a function of the acoustic frequency for the corresponding channel;
  a positioning zone Zb, in which the local noise generator is located, the positioning zone is defined (positioned and oriented) in a local reference frame connected to the antenna.

The detection 202 of the noise generators is carried out from the channels formed as a function of a detection criterion.

The detection criterion can comprise an intensity threshold, beyond which a noise generator is detected, which can be fixed or can at least depend on one of the aforementioned parameters and/or an acoustic frequency. The selection criterion can comprise a frequency criterion, which can comprise an acoustic frequency band, within which the acoustic frequency must be located. This frequency criterion can be fixed or can depend on at least one of the aforementioned parameters.

Figure 7:
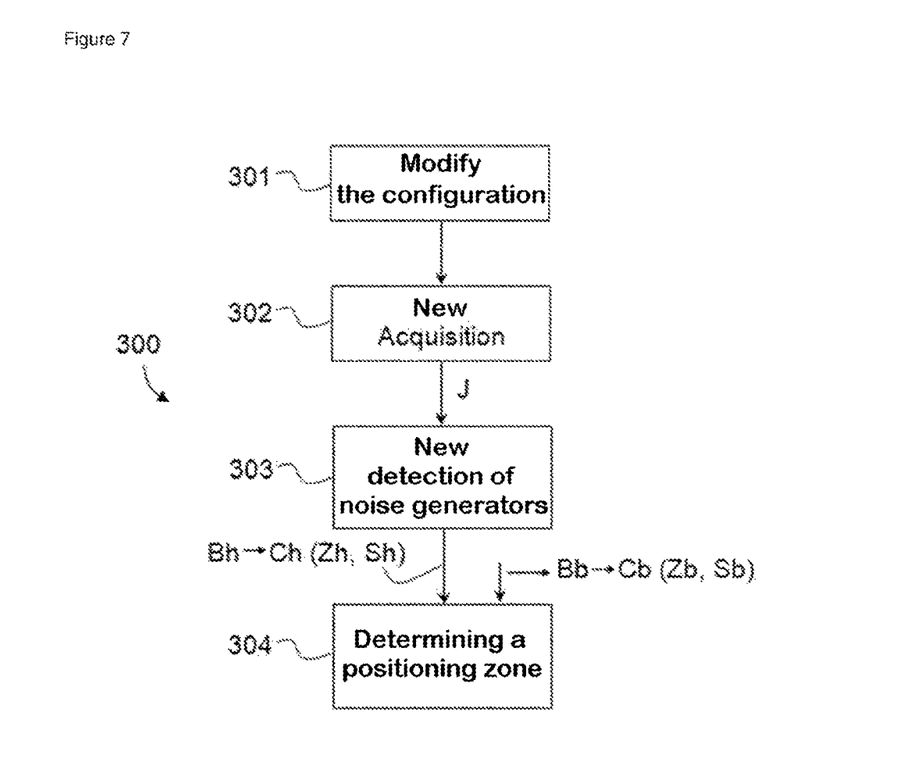
FIG. 7 shows steps of a location method according to the invention.

The invention relates to a method 300 for locating a noise generator comprising a step of estimating a positioning zone of the noise generator from several sets of acoustic measurements comprising:
  a first set of acoustic measurements acquired when the second longitudinal end E2 occupies a first position relative to the support S;
  a second set of acoustic measurements acquired when the second longitudinal end E2 occupies a second position relative to the support.

The location method 300 according to the invention comprises, for example, as shown in FIG. 7, a cycle of steps comprising the following successive steps:
  a step 301 of modifying the reception configuration of the antenna so that the antenna has a new reception configuration;
  a new step 302 of acquiring acoustic measurements, the antenna being in the new reception configuration, which allows a set J of acoustic measurements IA to be obtained;
  a new step 303 of detecting noise generators from the measurement set J;
  a step 304 of determining a positioning zone of a noise generator Bb detected during step 203 from features of the noise generator Bb detected during a previous cycle of steps or during step 202, when the cycle is the first cycle.

The cycle can be repeated one or more times or may not be repeated.

Advantageously, during at least one cycle of steps, the second position of the second end in the new reception configuration is different from the first position of the second end in the first reception configuration in a reference frame connected to the support. In other words, the second longitudinal end occupies a second position different from the first position relative to a reference frame connected to the support, it has an angle of elevation different from the angle of elevation it had in the first position and/or an azimuth different from the azimuth it had in the first position.

Step 301 is implemented by the adjustment means.

Step 302 is identical to step 202 to the nearest reception configuration.

Step 303 is identical to step 203 but it is carried out from the set of acoustic measurements measured during the current cycle in step 302.

On completion of the detection step 303, a set of features Ch is obtained for each detected noise generator Bh, with h=1 to H, where H is the number of noise generators detected during the detection step 303, said set of features Ch comprising:
- an acoustic signal Sh representing an acoustic intensity as a function of the acoustic frequency for the corresponding channel;
- a positioning zone Zh, in which the noise generator Bh is located, the positioning zone is defined (positioned and oriented) in a local reference frame connected to the antenna.

As an alternative embodiment, the number of noise generators detected during step 303 is zero.

Step 304 is implemented when the number of noise generators detected during step 303 is non-zero.

Step 304 involves defining an intersection zone between positioning zones obtained for different configurations of the reception antenna.

This step is determined from the position and the orientation of the support S, in each of the reception configurations, defined in a common reference frame, which is, for example, the terrestrial reference frame.

To this end, the positioning zones of the noise generator are advantageously defined, during the different noise generator location steps, in the same common reference frame, such as, for example, a reference frame connected to the support S or a terrestrial reference frame.

The location step then comprises a step of determining an intersection between the positioning zones in the common reference frame.

As an alternative embodiment, during the detection steps, the positioning zones of the noise generator are determined in a reference frame connected to the antenna that has moved between the two acquisition steps. The location step therefore comprises a step of changing the reference frame of the positioning zones in order to define these positioning zones in a common reference frame, relative to which the antenna moves between the two acquisition steps. However, this second method is more computation intensive.

Advantageously, step 304 comprises a step of changing the reference frame involving determining a position and an orientation of the different positioning zones of the noise generator in the same common reference frame. This reference frame is, for example, the terrestrial reference frame or a reference frame connected to the support S.

It should be noted that step 304 is implemented when a noise generator is detected during step 303 and when this noise generator is also detected during a previous cycle or during step 202.

When determining the position of a noise generator, an intersection of positioning zones determined for the same noise generator needs to be determined. Therefore, the method advantageously comprises, for each detected noise generator, a step of checking a similarity criterion between the detected noise generator and a noise generator detected in a previous cycle or during step 202.

This step can be carried out, for example, by comparing frequencies of the noise generators detected during several steps or by implementing a noise generator classification step.

A noise generator classification step involves associating the noise generator, based on its features, with a predetermined type of noise generator or identifying the noise generator, with the noise generator then being associated with an identity, for example. It is advantageously implemented from known features of noise generators of different known types stored in a database called classification database. Each type of noise generator is associated with different features, to which the features of the noise generator, and optionally its kinetic features, are compared. The type of noise generator associated with a noise generator is determined using a conventional comparison method, for example, by correlation or by a matching method.

For example, a noise generator can be associated with a type of seagoing or carrier vessel as a function of its acoustic frequency and its speed and of frequency and speed features of known carriers, such as a cargo ship and an outboard vessel, for example. In particular, an outboard vessel will have a frequency signature and a speed that are clearly different from those of a cargo ship.

The acoustic intensity of the acoustic signal from an antenna originating from the noise generator of interest can be used for classification in combination with the positions of the antenna and of the acoustic noise generator and, optionally, a reception feature of the antenna.

Step 304 is carried out from measurements obtained for the same noise generator, for example from measurements obtained for noise generators with the same identity, or for noise generators of the same type, or noise generators checking a predetermined similarity criterion.

Advantageously, the method comprises a step of storing the features or part of the features of each noise generator detected at each detection step. This allows the features of noise generators obtained during different acquisition steps to be compared and, for example, allows a previous configuration to be reestablished if the results in this configuration were optimal.

The location method is stopped when a stopping criterion is met.

This criterion is, for example, a precision criterion relating to the location of a noise generator.

The location zone of a noise generator can be transmitted to other sonar devices.

The method can comprise a phase of tracking a noise generator comprising a step of estimating kinetic features of the noise generator and a step of determining a new reception configuration of the antenna taken from among a set of configurations of the antenna so that the noise generator remains in a spatial coverage zone of the antenna during a subsequent acquisition step, in which the reception antenna is in the new reception configuration.

This step is advantageously carried out from a probability of detection of the antenna or POD (Performance of the Day). The POD defines a probability of detecting a noise generator by means of measurements obtained by the antenna in the spatial coverage zone of the reception antenna. The probability of detecting a noise generator located outside the spatial coverage zone, using acoustic measurements acquired by the antenna, is zero. The shapes of the spatial coverage zones that are obtained are relatively complex and non-uniform due to the non-linearity of sound propagation in water. They are defined (position, orientation) in a reference frame connected to the antenna.

The method can then comprise a step of determining the POD of the antenna.

The POD is determined, using a method known to a person skilled in the art, from:
- at least one technical feature of the antenna taken from among a detection frequency band, a maximum range, a gain and an inherent noise;
- at least one environmental feature taken from among a temperature or a temperature curve around the sensor, a depth of the seabed, a type of seabed, sea noise related to traffic and/or the condition of the sea, a wave direction.

As an alternative embodiment, the POD is predetermined for the values of the configuration parameters of the reception antenna. The system comprises, for example, a database storing POD values for different reception configurations of the antenna.

The step of determining the kinetic features of a noise generator involves estimating a direction of movement and a speed of the noise generator from features of the noise generator. This estimate is carried out, for example, by a comparison with at least one previous cycle, from positioning zones computed for a noise generator during several successive detection steps. These positioning zones must be defined in the same reference frame. The speed can be computed by determining a ratio between a distance between the positioning zones determined during two successive detection steps and a duration separating the corresponding acquisition steps.

The location method is advantageously implemented when a predetermined location criterion is checked. This location criterion can be met when a noise generator is detected or when a specification relative to a location of the noise generator is below a predetermined threshold.

Each subsequent configuration or subsequent orientation of the configuration antenna is defined, for example, from bathymetric properties and/or sea conditions. The successive reception configurations are predefined, for example.

The successive reception configurations are predefined, for example, for a predefined POD of the antenna. A database defines a sequence of reception configurations, for example.

As an alternative embodiment, the following configuration is defined from the result of the step for locating the noise generator of the current cycle and optionally of at least one preceding cycle.

The optimal configuration is determined by simulation, for example.

In one embodiment, only the angle of elevation and the azimuth are able to be modified from one reception configuration to another.

For example, the angle of elevation and the azimuth of the subsequent configuration are defined so that at least part of the positioning zone of the noise generator defined in the ongoing cycle is included in a plane perpendicular to the longitudinal axis of the reception antenna in the subsequent configuration. Preferably, the angle of elevation and the azimuth of the subsequent configuration are defined so that at least one generating line of the conical surface defined at the current cycle, i.e. in the ongoing cycle, is included in a plane perpendicular to the longitudinal axis of the antenna. Indeed, the positioning precision is finer in this plane.

The different configurations are defined, for example, by varying the angle of elevation and the azimuth as follows.

The first angle of elevation is equal to $-\pi/2$. For this angle, the azimuth is not detected.

The angle of elevation is then modified by increasing with each modification until the angle of elevation reaches a predetermined maximum angle of elevation.

For each angle of elevation, a plurality of consecutive configurations is determined, for which the location method is implemented. These successive configurations are as follows. The first configuration defined for each angle of elevation comprises a zero azimuth and, for each subsequent configuration, only the azimuth is modified so that the azimuth increases with each new configuration until it reaches $2\pi$ by assuming at least one and preferably several different values between 0 and $2\pi$.

As an alternative embodiment, for each new cycle, the angle of elevation and the azimuth are defined so that the cycle along the longitudinal axis of the antenna is substantially "perpendicular" to the positioning zone of the noise generator determined during the current cycle.

Advantageously, the sonar device comprises means for determining an orientation and/or a position of the support in the terrestrial reference frame. These means comprise, for example, an inertial unit or MEMS, allowing the movements of the support (acceleration and angular speed) to be integrated in order to estimate its position and/or its orientation (roll, pitch and heading angles) and/or its speed. The support can comprise a GPS receiver allowing satellite geolocation of the support. The orientation and/or position measurements of the support are advantageously used during the location step.

Advantageously, but not necessarily, the means for adjusting the orientation of the antenna comprise means for monitoring the position of the second end. These means can comprise, for example, MEMS allowing the movements of the second end of the antenna to be integrated. They can also use the measurements originating from the means for determining an orientation and/or a position of the support in the terrestrial reference frame to monitor the position of the second end E2.

The antenna can comprise sensors for determining a curvature of the reception antenna. This curvature is advantageously used when forming channels. This allows the deformation of the antenna to be digitally compensated.

The sonar device is, for example, free in the water so as to drift under the effect of sea currents. This solution is light and has a certain amount of discretion relative to a threat due to the unpredictable nature of the position of the sonar device. As an alternative embodiment, the main support is substantially fixed relative to the terrestrial reference frame. This solution is heavier and more expensive, yet it does allow some control over the position of the antenna and is suitable for monitoring port areas in which maritime traffic must not be disrupted.

Advantageously, the antenna is configured so as to allow acoustic waves to be detected with a frequency ranging between 1 kHz and 10 kHz.

It should be noted that the sonar device comprises one or more acoustic reception antennae.

The processing means and the control means can comprise one or more dedicated electronic circuits or a general purpose circuit. Each electronic circuit can comprise a reprogrammable computation machine (a processor or a microcontroller, for example) and/or a computer executing a program comprising a sequence of instructions and/or a dedicated computation machine (for example, a set of logic gates such as an FPGA, a DSP or an ASIC, or any other hardware module).

The processing means TRAIT and the control means COM can be remote, i.e. separate from the antenna or not mechanically connected to the antenna. They are installed, for example, in a processing unit, located on land or on a seagoing vessel, which can be a surface ship or a submarine, or on a buoy independent of the main support, and are connected in order to communicate, for example, by satellite, with the reception antenna. As an alternative embodiment, at least part of the processing means and/or at least part of the control means COM is mechanically connected to the sonar device. The invention relates to the sonar device comprising the processing means TRAIT and the control means COM or to a sonar system comprising the sonar device and the processing means TRAIT and the control means COM.

The invention claimed is:

1. A sonar device (D) comprising a support (S) having negative buoyancy and a linear acoustic reception antenna (A), the linear acoustic reception antenna (A) comprising an elongated body (C) that is elongated from a first end (E1) to a second end (E2), the elongated body (C) being connected by the first end (E1) at a connection point (PL) that is fixed relative to the support (S), the sonar device (D) being able to be in a reception configuration,
wherein an antenna body (C) is fully submerged and the support (S) is fully submerged and the antenna body (C) is able to be in a vertical orientation,
wherein the antenna body extends substantially vertically from the first end (E1) to the second end (E2) toward the seabed,
the sonar device (D) comprising an orientation adjusting device configured to adjust an orientation of an angle of elevation and an azimuth of the second end (E2) in a reference frame connected to the support (S) centered on the connection point (PL), when the sonar device (D) is in the reception configuration and the support (S) is fixed relative to a terrestrial reference frame.

2. The sonar device as claimed in claim 1, comprising a position adjusting device configured for adjusting a relative positioning of electro-acoustic transducers of the linear acoustic reception-antenna (A) when the second end (E2) has a predetermined angle of elevation and a predetermined azimuth.

3. The sonar device as claimed in claim 1, comprising a processing unit (TRAIT) configured to locate a noise generator (B) from several sets of acoustic measurements generated by the linear acoustic reception antenna (A), said several sets of acoustic measurements comprising a first set of measurements acquired by the linear acoustic reception antenna (A) when the second end occupies a first position relative to the support and a second set of measurements acquired by the linear acoustic reception antenna (A) when the second end occupies a second position relative to the support (S).

4. The sonar device as claimed in claim 1, wherein the linear acoustic reception antenna (A) comprises a plurality of acoustic transducers distributed along a row of transducers that is able to be rectilinear and has a curvature that is able to vary under the effect of movement of the second end relative to the support (S).

5. The sonar device as claimed in claim 1, wherein the linear acoustic reception antenna (A) comprises a plurality of acoustic transducers distributed along a straight row of transducers.

6. The sonar device as claimed in claim 1, wherein the antenna body (C) is connected to the support (S) by a ball joint.

7. The sonar device as claimed in claim 3, wherein the position adjusting device comprises a driving device (ENT) configured for moving the second end (E2) relative to the support (S).

8. The sonar device as claimed in claim 7, wherein the driving device (ENT) comprises a propulsion unit.

9. The sonar device as claimed in claim 7, wherein the driving device (ENT) comprises a ballast having a variable mass density.

10. The sonar device as claimed in claim 7, wherein the driving device (ENT) is mounted on the antenna body (C).

11. The sonar device as claimed in claim 8, wherein the the propulsion unit is able to transiently cooperate with the antenna body (C) to allow adjustment of the angle of elevation and the azimuth of the second end (E2).

12. The sonar device as claimed in claim 1, comprising a submersion adjustment device for adjusting a depth of the linear acoustic reception antenna (A).

13. A method for locating a noise generator from a sonar device (D) as claimed in claim 1, the location method comprising a step of estimating a positioning zone of the noise generator from several sets of acoustic measurements comprising:
a first set of acoustic measurements acquired when the second end occupies a first position relative to the support;
a second set of acoustic measurements acquired when the second end occupies a second position relative to the support.

14. A method for detecting and locating a noise generator from a sonar device as claimed in claim 1, comprising the following steps:
acquiring a first set of acoustic measurements when the second end occupies a first position relative to the support;
acquiring a second set of acoustic measurements when the second end occupies a second position relative to the support;
detecting a noise generator from the first set of acoustic measurements and the second set of acoustic measurements;
estimating a positioning zone of the noise generator from the first set of acoustic measurements and from the second set of acoustic measurements.

* * * * *